Figure 1:
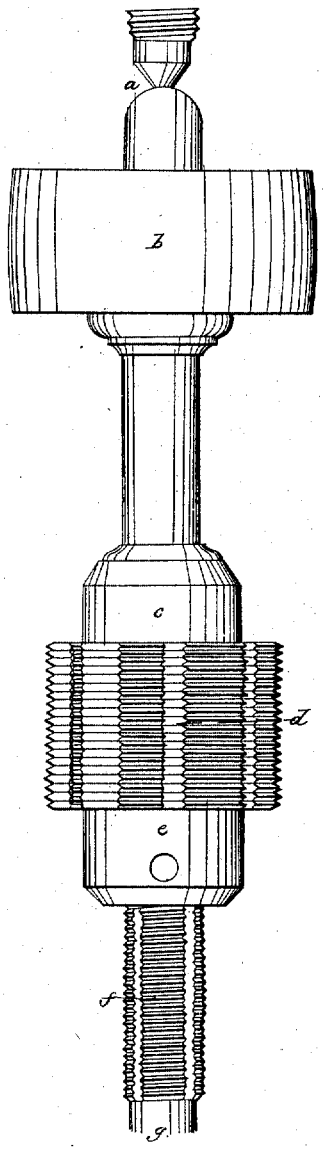

7157X

J. HALL.

PEG AND PIN POINTING MACHINE.

Patented July 7, 1832.

THE NORRIS PETERS CO., PHOTO-LITHO., WASHINGTON, D. C.

7157X

July 7. 1832
James Hall, of North Bridgewater, Mss:
Letters Patent

The Schedule referred to in these Letters Patent, and making a part of the same, containing a description in the words of the said James Hall, himself of his improvement in the mode of pointing pegs & pins —

---

To all to whom these presents shall come; Be it known that I, James Hall of North Bridgewater, in the County of Plymouth, in the State of Massachusetts, trader, have invented a new & useful improvement in the mode of pointing pegs & pins, called Hall's peg & pin pointing machine, & the following is a full & exact description of the construction & operation of the said machine as invented by me. This machine is constructed in the following manner. a tooth or any number of teeth are fixed on a shaft, so that when the shaft revolves the tooth or teeth may strike into a peg block or pin block, that is, the block proposed to be cut or split into pegs or pins for the purpose of making the points of the pegs or pins before splitting the block into pegs or pins —

In the tooth or teeth cut a groove or bevel, or a number of grooves or bevels across the end of this block & the number of teeth or sets of teeth may be such as to cut the whole surface of the end of the block, or only a part of it into such grooves or bevels at one operation — If only a part of the surface of the end is so cut at one operation, then the operation may be repeated until the whole surface is grooved or beveled in one direction. the block being guided by a gauge or the hand, so as to take a breadth at each operation, equal to that of the sets of teeth if more than one, or if only one, then to take a breadth at each operation equal to the diameter of a peg or pin when split out — The end of the block being thus grooved in one direction is then again passed over or across the tooth or teeth, while in motion, as herein afterwards described, in a direction at a right or oblique angle to the former grooves or bevels, so as to cut the whole surface of the end of the block into bevels or grooves, at a right, or an oblique angle to the former grooves or bevels, thus the whole end of the block will be divided off & cut into points —

The tooth or teeth should be so fixed to the shaft, or should be so cut

[illegible]

78 7157X on a circular plate fastened upon a shaft, with the plane of the plate standing
perpendicularly to the axis of motion of the shaft or so fixed to any projection
or projections from the shaft that the tooth or teeth may strike into the wood
obliquely to the surface which they are to cut away precisely as the teeth of
a circular saw strike obliquely to the surface, which such saw cuts away in
its action, for the tooth or teeth ought not merely to scrape or tear away the
wood as they must do, if they stood, perpendicularly to the surface on which
they were acting but they ought to act upon it obliquely so as to cut the wood
away — The machine will operate it is true, if the teeth stand in the direction
of radii to the axis of motion of the shaft, but it will operate better & with less
power to produce the same effect, if they make an angle with such radii by pro-
-jecting or leaning towards the direction in which the machine moves round
when the shaft revolves, precisely for the reason that the teeth of a circular
saw project or lean in such direction, viz, that they may cut instead of merely
tearing or scraping away whatever material is to be sawed —
The extremity of the tooth of this machine is not like that of the common
saw, brought to an edge, but is brought to a point, so that in acting in
cutting the wood, as the block is made to pass over it, it cuts out a bev-
-eled channel of which a transverse section will be either an isosles or a
scaline triangle, that is the two sides of the bevel may be either of equal
or unequal obliquity & transverse dimensions & one may be oblique & the
other perpendicular to the surface of the peg block in which the points are
to be made; though the inventor deems it best that the two sides should
be of equal obliquity & transverse dimensions so as to make the point of the
peg, in the centre instead of being towards one side of the peg or pins —
It is not necessary however that the groove or bevel should be so cut
that its two sides shall be planes & its transverse section make a figure of
which the sides shall be straight lines, for the teeth may be so formed
that such transverse section will present two curved sides —
It is only necessary that the surface of the end of the block to which
the machine is applied, may on the block being moved over the machine
in two different directions while the machine is in motion, as already
described be cut into points, but it is not material whether these points

7157X have plane or curved sides, or whether a transverse section of the point at right angles to the length of the peg or pin would present a rectangular or other figure — It is only necessary that the block should be so beveled in different directions that on the operations being performed it shall present a set of points — These terminations of the pegs or pins are denominated points, in this Specification, as they are in common language, but still it is not necessary, nor is this Specification to be understood as assuming that they should be strictly & literally points —

Supposing the points to be pyramidal as they usually are, the small pyramid making the point may be truncated so as to make the extremity of the peg or pin more or less blunt, and still the peg or pin may answer very well for driving — This will evidently depend upon the size of the peg or pin & the size of the hole or the kind of substance into which it is to be driven — As to the degree of obliquity of the sides or surfaces of these points, or in other words whether the point of a peg or pin of a given diameter shall be longer or shorter, that is more or less tapering or rather whether it shall taper more or less rapidly, is not a material circumstance in this specification —

The teeth of the machine may be so formed as to make the grooves or bevels proportionally deeper or shallower, & so make the points more or less tapering as may be preferred & different sets of teeth may be used in cutting the first set of bevels from those used in cutting the second or cross bevels & one set may be cut deeper than the other, so that the peg or pin when split out will present some of the sides of the points more tapering than the others —

One mode out of the various ones which may readily be conceived for constructing this machine is to take a number of circular steel plates of a thickness not exceeding the diameter of the pegs or pins proposed to be made the plates to have holes in the centre thro' which the shaft may pass being so constructed that the plates may be fastened by screws or wedges or otherwise, to the shaft in a manner similar to fixing circular saws to their shafts — Any number of these circular plates may be fixed on the same shaft in a manner not unlike a gang of circular saws, each circular plate may have one or more teeth at its outer edge or circumference it will be better economy of materials & of labor in operating the machine

7157X to make teeth round the whole of the circumference of the plate so that it will
except in the form of the teeth, as already specified, resemble a circular saw —
If the thickness of the plates is equal to the proposed diameter of the pegs or pins
then the plates may be fastened on in contact with each other, but if of less
thickness, a layer of paper or thin plate or ring of iron or other substance may
be interposed between each two plates, or the plates may be otherwise separa-
ted — Where the plates are thus separated & the teeth at the broadest part or
base, are only equal to the thickness of the circular plate which will ev-
idently always be the case, where the teeth are cut out of the plate itself, it
is apparent that the block will be so beveled and cross beveled by the action
of the machine, as to make a blunt or truncated points —
It will readily occur to any mechanic that the teeth should be of a ma-
terial suitable for edge tools & accordingly that if the teeth are cut in the cir-
cular plate itself & not fastened to it, the circular plate should also be of such
material & the inventor deems this the best way of forming the machine, tho' he
does not confine his invention to this particular mode of construction, as dif-
ferent modes of constructing the teeth & fixing them so as to be put in motion by
the revolution of the shaft will readily occur to every mechanic —
The teeth used for this machine by the inventor are of a triangular form point-
ed & leaning as already described, & they make the two sides of the bevels of equal
obliquity and transverse dimension — The teeth may be so formed that each
one cuts on both sides, or that they may cut alternately one on one side &
the next on the other side & if so formed the cutting side will be formed into
an edge more or less acute — The form of the tooth may be varied as will
readily be perceived by making its cutting edges curved & the exterior surface
curved, so that the whole tooth shall present an oblique longitudinal section
of a cone — In this respect the tooth may be formed as may be deemed expe-
dient, by the constructor of the machine — The shaft with the teeth attached
being fixed on gudgeons or supported by points at each end, or otherwise support-
ed so as to be turned conveniently by means of a crank or pulley or drum &
band, or otherwise for which purpose the power of the hand or foot, or horse
power, water power or steam power or any other suitable power may be applied.
The most convenient position of the shaft of the machine is deemed by the Inventor to be a horizontal one the constructor however may have the option
of placing it horizontally or obliquely or perpendicularly -
The machine being then put in motion by revolving the shaft in the direction of
the inclination of the teeth, that end surface of the peg-block or pin-block or log
of peg-wood or pin wood which is proposed to be cut into points is made to pass
over the teeth of the cutter or rather across them, whether over or under, up or
down, in a direction contrary to that of the circular motion of the cutter so that
the points are formed by means of its passing more than once over or across the ma-
chine, or over or across more than one machine successively, the position of the
log or block being changed at each successive operation, so as to make the teeth
cut across the end or surface in different directions -
The peg block or pin block must of course be gauged, so as to allow the teeth
to cut a proper depth, and so as to regulate the direction in which the block
shall move & the teeth shall cut - The block may be thus gauged by moving
it on a plane surface, or on plain or straight surfaces - When the operation of
cutting is performed there being an opening in such plane surface, or between
such plane or straight surfaces thro' which the teeth may project beyond the
surface or surfaces to a proper extent for the depth of the bevel -
And it may be gauged laterally by a straight rod or bar or any other gauge
The block or log as it is moved over or across the machine for the purpose of
cutting the points may be gauged in both respects above specified in a great
variety of ways as the constructor may prefer, the gauging of the block in
both respects being a matter of ordinary mechanical skill - The block may be mo-
ved over or across the machine by hand or by any mechanical contrivance as
the constructor of the machine may prefer - The peg blocks or pin blocks may either
be sawed off so as to be of the proper length with the grain of the wood, for the
length of the pegs or pins before the points are made with the machine or the
points may be made in the end of the log of peg wood or pin-wood and then
the end may be sawed off at a distance proper for the length of the pegs or pins.
The construction & mode of operation of the machine will be better understood by
an examination of the annexed drawings -
The inventor claims as his invention for which he has a right to a Patent,
the modes of construction as above described, whereby a circular motion is 12 7157X given to the teeth when in operation in forming the points as set forth in the foregoing Specification - In testimony that the above is a true Specifica-tion of my said Invention as above described, I have hereto set my hand this sixteenth day of June in the year of our Lord, eighteen hundred & thirty-two -

Witnesses
Richd. Robins
C. T. Murdock
Willard Phelps

James Hall

[2072 [illegible]